3902

Reissued Apr. 5 1870

Fig.

William Miller's Impd Coal Scuttle.
Patented March. 10. 1863

Witnesses
M. S. Partridge
Daniel Robertson

Inventor
William Miller

United States Patent Office.

JAMES EDGAR, OF NEWARK, NEW JERSEY, ASSIGNEE OF WILLIAM MILLER.

*Letters Patent No.* 37,871, *dated March* 10, 1863; *reissue No.* 3,902, *dated April* 5, 1870.

IMPROVEMENT IN COAL-SCUTTLES.

The Schedule referred to in these Letters Patent and making part of the same.

*To all whom it may concern:*

Be it known that WILLIAM MILLER, of the city, county, and State of New York, did invent a new and useful Improvement in Coal-Scuttles; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
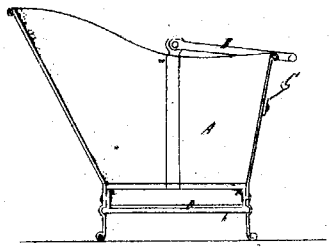
Figure 1 represents a longitudinal vertical section of this invention.
Figure 2:
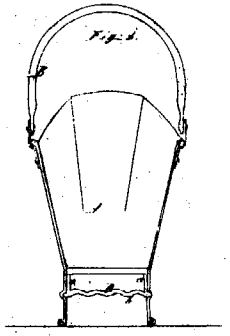
Figure 2 is a transverse vertical section of the same.
Figure 2:
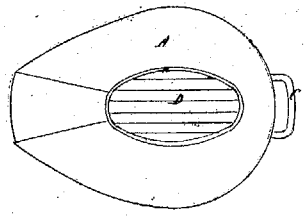

This invention consists in making the bottom of a coal-scuttle corrugated in such a manner that, by the corrugations, a certain degree of elasticity is imparted to said bottom, and that the bottom, even if made comparatively light, preserves considerable strength and durability, much superior in this respect to the ordinary plain or concave bottom.

In the drawing—

The letter A designates a coal-scuttle made of sheet metal, in the ordinary shape, and provided with a bail, B, and handle C, as usual.

The bottom D of this scuttle is made corrugated, and provided with a flange, *a*, so that it can be fastened to the body of the scuttle by rivets or any other convenient and suitable means.

If desired, the bottom may be strengthened by a ledge, *b*, extending across its under surface.

The corrugations of the bottom D increase its strength, and impart to the same a certain degree of elasticity, so that the same can be made very thin and light, and that it will still preserve sufficient firmness to withstand the blows to which it may be exposed, if large lumps of coal are dropped into the scuttle.

What is claimed as new, and desired to be secured by Letters Patent, is—

1. A corrugated bottom, D, for coal-scuttles, as a new article of manufacture.

2. The combination of a corrugated bottom, D, with a coal-scuttle, A, substantially as and for the purpose described.

JAMES EDGAR.

Witnesses:

W. HAUFF,

E. F. KASTENHUBER.